United States Patent
Kamepalli et al.

(10) Patent No.: US 11,281,298 B1
(45) Date of Patent: Mar. 22, 2022

(54) SYSTEM AND METHOD FOR DYNAMICALLY DISABLING HAPTIC FEEDBACK WITH RECOGNITION OF PEN ON TOUCH SENSITIVE AREA OF AN INFORMATION HANDLING SYSTEM

(71) Applicant: DELL PRODUCTS, LP, Round Rock, TX (US)

(72) Inventors: Srinivas Kamepalli, Austin, TX (US); Lee Zaretsky, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/130,271

(22) Filed: Dec. 22, 2020

(51) Int. Cl.
  *G06F 3/01* (2006.01)
  *G06F 3/0354* (2013.01)
  *G06F 3/044* (2006.01)
  *G06F 3/041* (2006.01)

(52) U.S. Cl.
  CPC .......... *G06F 3/016* (2013.01); *G06F 3/03545* (2013.01); *G06F 3/0441* (2019.05); *G06F 3/0442* (2019.05); *G06F 3/04144* (2019.05); *G06F 2203/04106* (2013.01)

(58) Field of Classification Search
  CPC .. G06F 3/016; G06F 3/04144; G06F 3/03545; G06F 3/0442; G06F 3/0441; G06F 2203/04106; G06F 3/04
  See application file for complete search history.

(56) References Cited

U.S. PATENT DOCUMENTS

| | | | |
|---|---|---|---|
| 9,319,150 B2 | 4/2016 | Peeler et al. | |
| 2002/0033795 A1* | 3/2002 | Shahoian | G06F 1/169 345/156 |
| 2014/0167941 A1* | 6/2014 | Rank | G08B 6/00 340/407.1 |
| 2014/0168142 A1* | 6/2014 | Sasselli | G06F 3/0416 345/174 |
| 2015/0091859 A1* | 4/2015 | Rosenberg | G06F 3/04162 345/174 |
| 2017/0097720 A1* | 4/2017 | Shin | G06F 3/0383 |
| 2018/0129335 A1 | 5/2018 | Stone et al. | |

* cited by examiner

*Primary Examiner* — Lunyi Lao
*Assistant Examiner* — Jarurat Suteerawongsa
(74) *Attorney, Agent, or Firm* — Larson Newman, LLP

(57) ABSTRACT

An information handling system includes a touch sensitive area, which in turn includes an array of pressure sensors and a haptics controller. The array of pressure sensors includes a first pressure sensor. When activated, the first pressure sensor provides an XY location based on a location of the first pressure sensor in the array of pressure sensors. The haptics controller receives an XY location from the first pressure sensor, and a location of a pen device from a pen digitizer circuit. The haptics controller calculates whether the XY location and the location of the pen device are substantially the same location. In response to the XY location and the location of the pen device being substantially the same location, the haptics controller disables haptic feedback within the touch sensitive area.

17 Claims, 5 Drawing Sheets

SYSTEM AND METHOD FOR DYNAMICALLY DISABLING HAPTIC FEEDBACK WITH RECOGNITION OF PEN ON TOUCH SENSITIVE AREA OF AN INFORMATION HANDLING SYSTEM

FIELD OF THE DISCLOSURE

The present disclosure generally relates to dynamically disabling haptic feedback with recognition of pen on touch sensitive area of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a touch sensitive area, which in turn includes an array of pressure sensors and a haptics controller. The array of pressure sensors includes a first pressure sensor. When activated, the first pressure sensor may provide an XY location based on a location of the first pressure sensor in the array of pressure sensors. The haptics controller may receive an XY location from the first pressure sensor, and a location of a pen device from a pen digitizer circuit. The haptics controller may calculate whether the XY location and the location of the pen device are substantially the same location. In response to the XY location and the location of the pen device being substantially the same location, the haptics controller may disable haptic feedback within the touch sensitive area.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
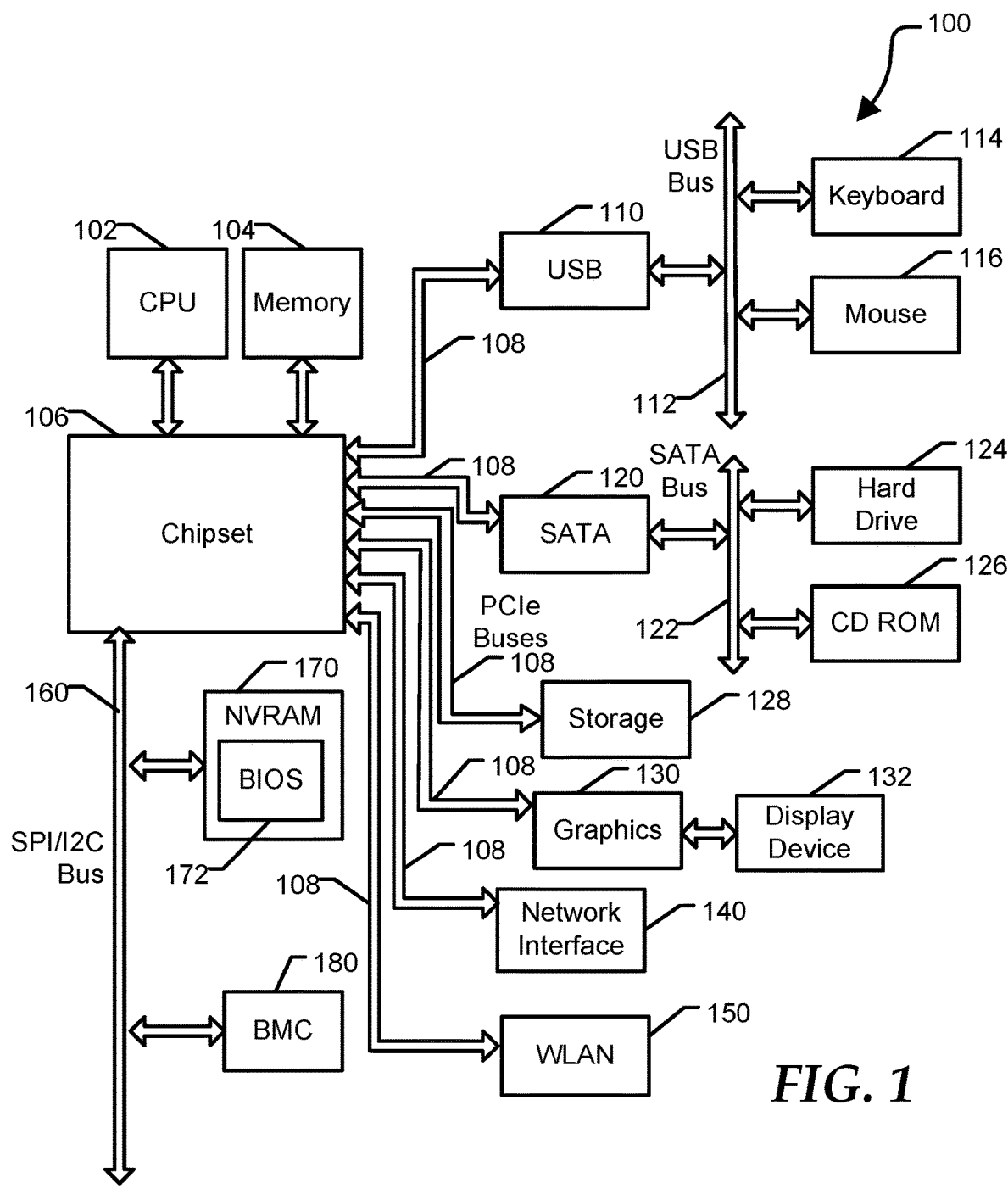
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
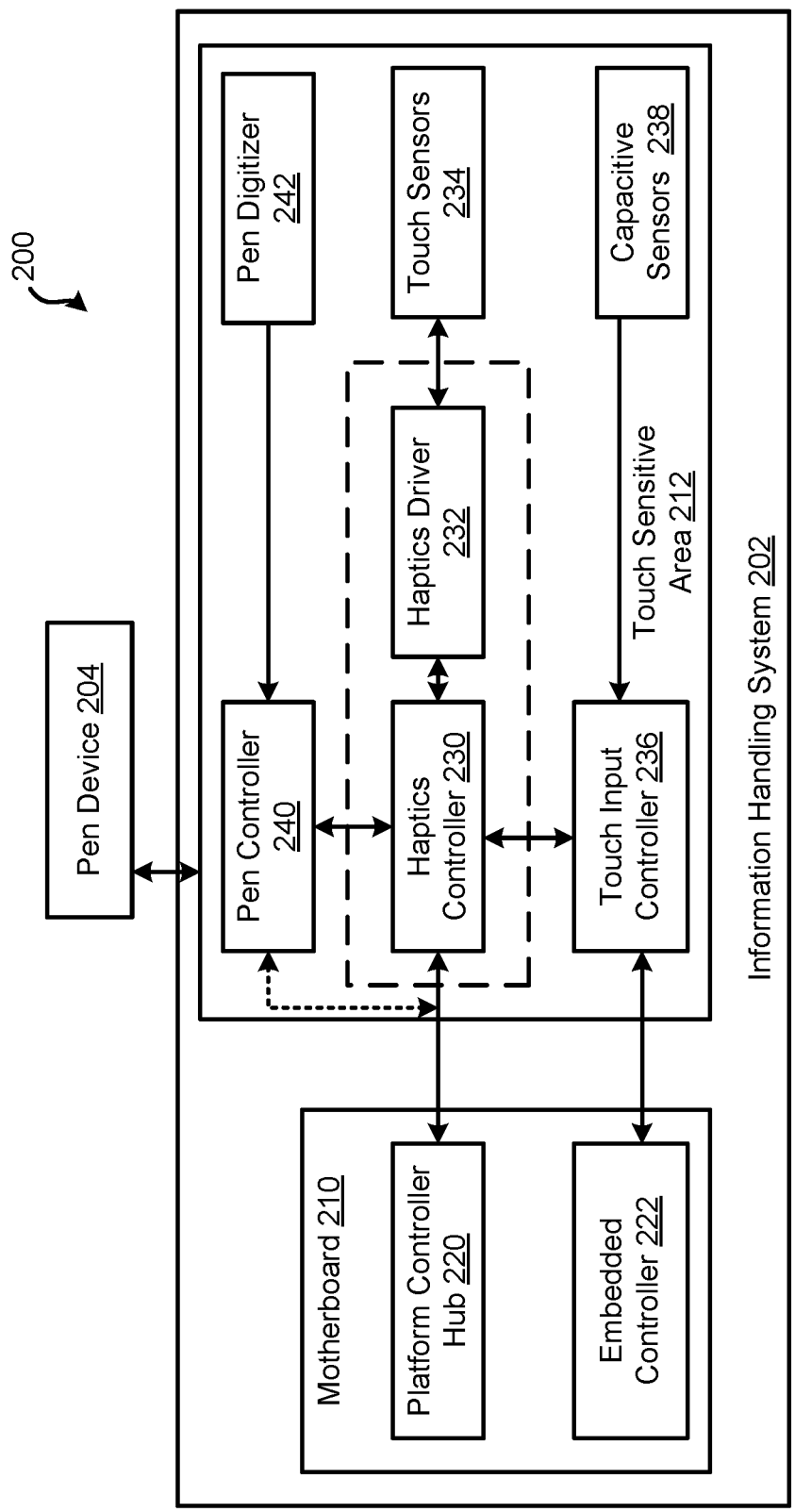
FIG. 2 is a diagram of a portion of a system according to at least one embodiment of the present disclosure.

In an example, information handling system 100 may be any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

FIG. 2 illustrates a portion of a system 200 including an information handling system 202 and a pen device 204 according to at least one embodiment of the present disclosure. Information handling system 202 includes a motherboard 210 and a touch sensitive area 212. Pen device 204 may be any suitable input device including, but not limited to, an active device or stylus and a passive device or stylus. Motherboard 210 includes a platform controller hub 220 and an embedded controller 222. Touch sensitive area 212 is associated with one or more components including, but not limited to, a haptics controller 230, a haptics driver 232, a touch sensor 234, a touch input controller 236, a capacitive sensor 238, a pen controller 240, and a pen digitizer circuit 242. In an example, touch sensitive area 212 may be any suitable component of information handling system 202 including, but not limited to, a touch pad and a touch display or screen. In certain examples, haptics controller 230, touch input controller 236, and pen controller 240 may be combined in a single controller without varying from the scope of this disclosure. Similarly, touch sensors 234, capacitive sensors 238, and pen digitizer 242 may be combined a single set or array of sensors without varying from the scope of this disclosure.

In certain examples, haptics controller 230 and haptics driver 232 may be combined to form a haptic feedback circuit as indicated by the dashed box in FIG. 2. Capacitive sensors 238 may be an array of capacitive sensors located under touch sensitive area 212, and each capacitive sensor in the array may detect and measure proximity between pen device 204 and the touch sensitive area. Touch sensors 234 may be an array of piezoelectric sensors located under touch sensitive area 212. The piezoelectric sensors may detect a force applied to touch sensitive area 212, and may provide an electrical charge to haptics driver 232 based on an amount of force detected. Pen digitizer 242 may be any suitable sensor or components capable of detecting pen device 204 and determining a distance the pen device is from touch sensitive area 212 and a location of the pen device. In certain examples, information handling system 202 may include any additional number of components without varying from the scope of this disclosure.

During operation, components of information handling system 202 may perform one or more operations to detect an input on touch sensitive area 212. For example, the input may be any suitable input including, but not limited to, pen device 204 and a finger. In response to the input on touch sensitive area 212, information handling system 202 may provide haptic or audio feedback to a user. However, feedback to the user may not be a satisfactory user experience for all possible inputs. While haptic or audio feedback may be suitable for touch or click inputs from a finger on touch sensitive area 212. If pen device 204 is utilized to provide an input on touch sensitive area 212, haptic feedback to the pen input may not be desirable and may cause issues in cases where pen is used for drawing, drafting, content creation, or the like. Information handling system 202 may be improved by haptics controller 230 adjusting or eliminating feedback based on the input source, the workload, the expectations of the user, or the like.

Figure 3:
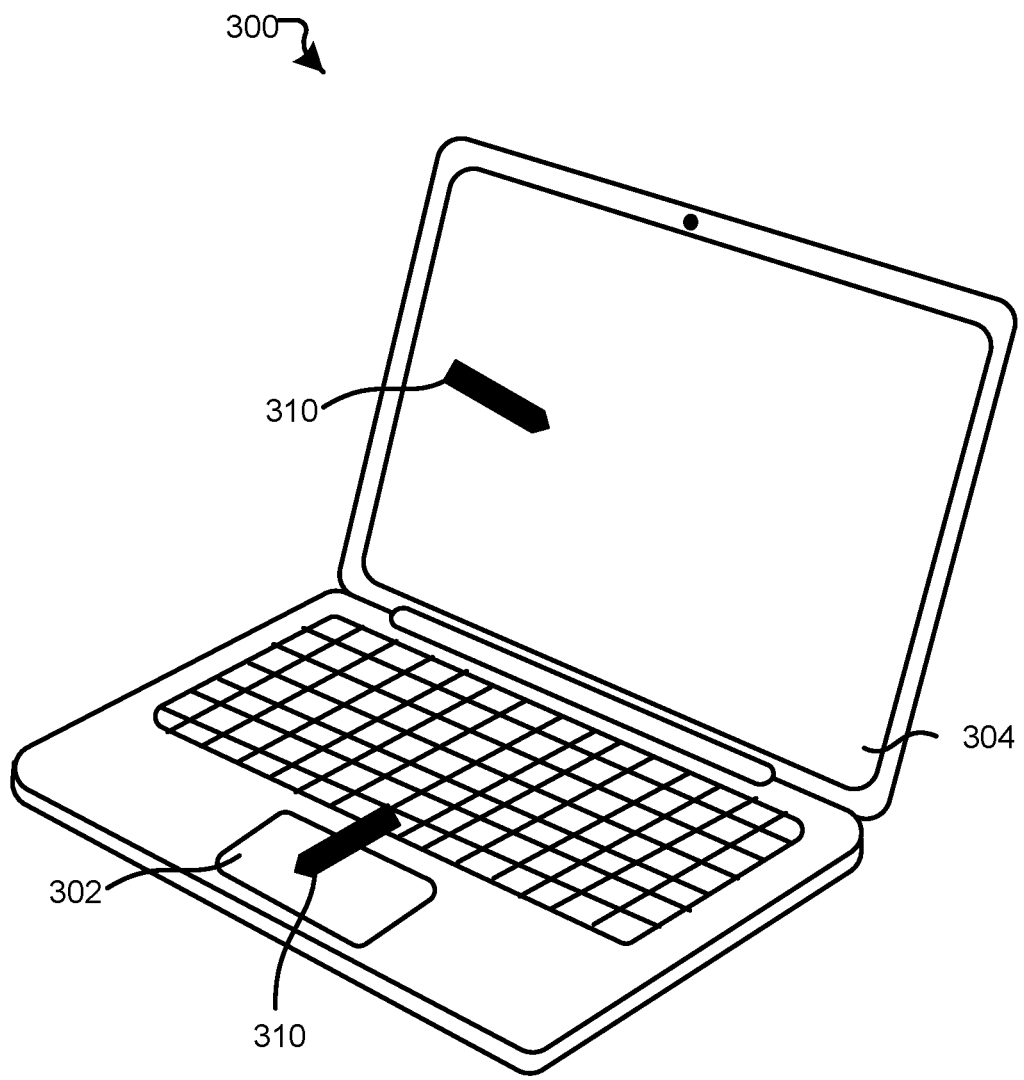
FIG. 3 is a diagram of an information handling system interfacing with a pen device according to at least one embodiment of the present disclosure.
Figure 4:
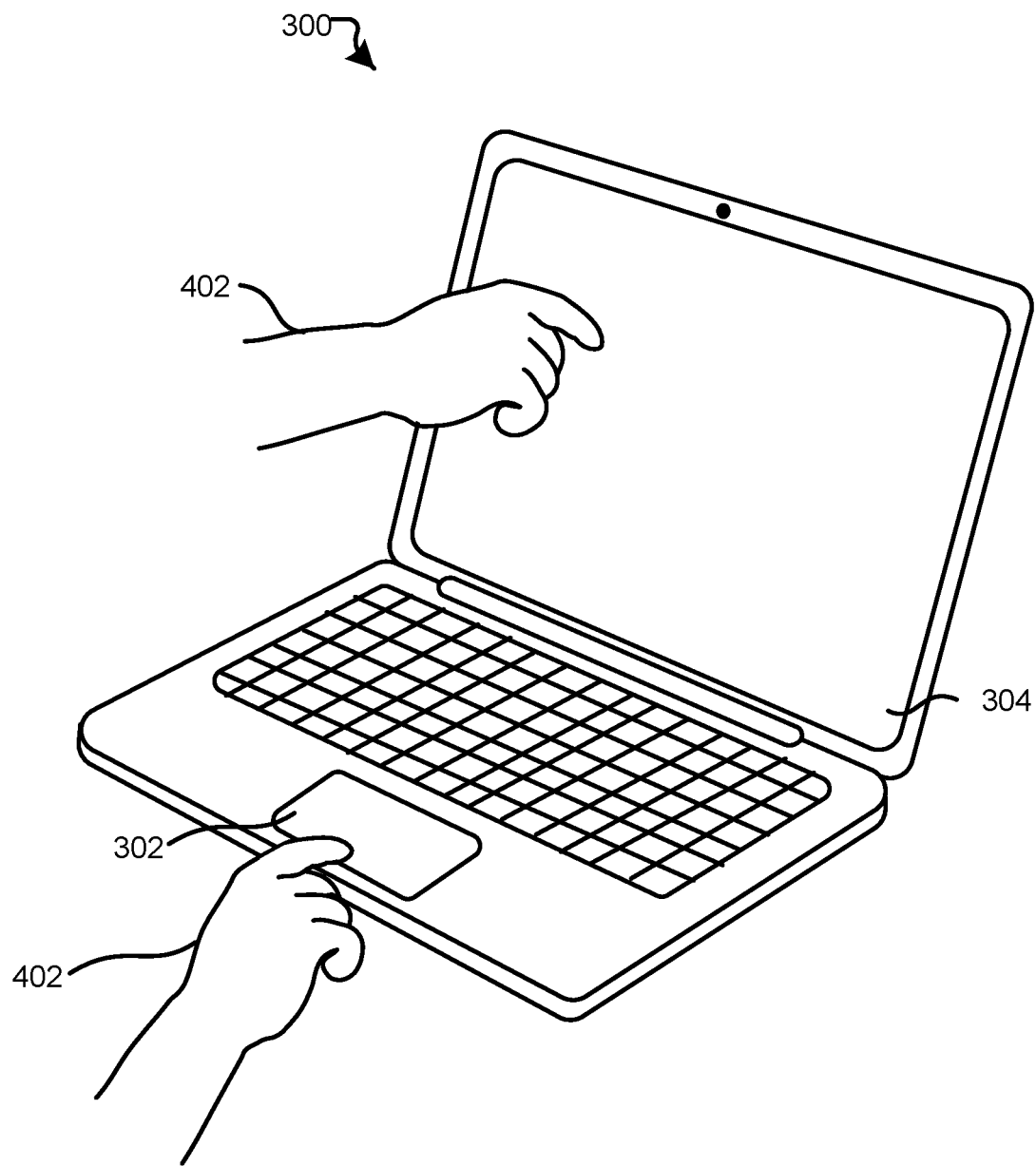
FIG. 4 is a diagram of an information handling system interfacing with a finger according to at least one embodiment of the present disclosure.

Referring now to FIGS. 3 and 4, an information handling system 300 includes a touch pad 302 and a display screen 304 according to at least one embodiment of the present disclosure. In an example, information handling system 300 may interface with a pen device 310 as illustrated in FIG. 3 or a finger 402 as illustrated in FIG. 4. For example, pen device 310 and finger 402 may interface with both touch pad 302 and display screen 304. Information handling system 300 may be any suitable information handling system, such as information handling system 202 of FIG. 2. In certain examples, pen device 310 may be any suitable pen device, such as pen device 204 of FIG. 2. Touch pad 302 and display screen 304 may receive touch inputs, such as an input from pen device 310 and finger 402. Touch pad 302 and display screen 304 may be substantially similar to touch sensitive area 212 of FIG. 2.

In an example, information handling system 300 may receive multiple inputs at the same time, such as pen device 310 and finger 402. Depending on the input source touch pad 302 and display screen 304 may provide haptic feedback. For example, in response to the input being finger 402, touch pad 302 and display screen 304 may provide haptic feedback, such as a click, pop, vibration, or the like. In response to the input being pen device 310, touch pad 302 and display screen 304 may not provide haptic feedback. Information handling system 300 may perform one or more suitable operations to dynamically disable haptic feedback based on the input source to touch pad 302 and display screen 304 as will be described with respect to FIG. 2.

Referring back to FIG. 2, a touch input may be detected on touch sensitive area 212 and one or more components of information handling system 202 may determine whether to disable haptic feedback based on the type of input. In certain examples, the touch input may be a scroll, swipe, click, writing, drawing, or the like within touch sensitive area 212. In an example, if a finger, such as finger 402 of FIG. 4, is placed in physical communication with touch sensitive area 212, the touch input may be provided to haptics driver 232 and capacitive sensor 238 may provide a touch location to touch input controller 236. If pen device 204 is not detected by pen digitizer 242 when the touch input is received, touch input controller 236 may determine a finger, such as finger 402 of FIG. 4, has provided the touch input. Based on the touch indication, touch input controller 236 may determine or calculate an XY location for the touch input based on the location of capacitive sensor 238 within an array of capacitive sensors.

In response to the XY location for the touch input being calculated and the touch input being for finger 402, touch input device controller 236 may provide the XY location to haptics controller 230. Based on the reception of the XY location, haptics controller 230 may determine that haptic feedback may be provided to at the XY location. Haptics controller 230 may then utilize haptic drivers 232 to provide haptic feedback at the given XY location of the touch input from finger 402.

In an example, pen device 204 may be placed within a predetermined distance to touch sensitive area 212, such as touch pad 302 and display screen 304 of FIG. 3. In response to the pen device 204 being placed within a predetermined distance to touch sensitive area 212, pen digitizer 242 may detect the pen device, and as a result the pen digitizer may provide information about a location of the pen device to pen controller 240. In an example, the predetermined distance may be any suitable distance including, but not limited to, three millimeters, four millimeters, and five millimeters. Pen controller 240 may provide a location of pen device 204 to haptic feedback circuit, such as haptics controller 230. In certain examples, pen controller 240 may provide pen hovering information, such as proximity between pen device 204 and touch sensitive area 212, and a pen location of the pen device to the haptic feedback circuit via any suitable communication, such as an inter-integrated circuit (I²C) communication between the pen controller and the haptics controller.

In response to pen device 204 being placed in physical communication with touch sensitive area 212, a touch sensor in the array of touch sensors 234 may active based on pressure from the pen device. In response to touch sensor 234 being activated, the touch sensor may provide the feedback circuit with a XY location and pressure information associated with the physical communication between pen device 204 and touch sensitive area 212. In an example, the XY location and pressure information may be received from a piezoelectric sensor in an array of piezoelectric sensors. In certain examples, the XY location may be calculated in any suitable manner including, but not limited to, an XY location assigned to the particular piezoelectric sensor based on its location within the array of piezoelectric sensors.

In an example, haptics controller 230 of the feedback circuit may receive the XY location from touch sensors 234, and pen controller 240 may receive a location of pen device 204 from pen digitizer 242 or touch input controller 236 may receive the location of the pen device from capacitive sensors 238. Haptics controller 230 of the feedback circuit, pen controller 240, or touch input controller 236 may compare the XY location and the location of pen device 204. If the location of pen device 204 substantially matches the XY location, haptics controller 230 may disable haptic feedback of touch sensitive area 212. In an example, the disable haptic feedback setting may be continued as long as pen device 204 is within the predetermined proximity to touch sensitive area 202.

If the location of pen device 204 does not substantially match the XY location, haptics controller 230 may continue to provide haptic feedback at the XY location. In an example, the haptics may be any suitable feedback including, but not limited to, a click, a pop, and a vibration. In certain examples, the haptic feedback may also be accompanied by an audio feedback.

In an example, pen device 204 and a finger, such as finger 402 of FIG. 4, may be detected on touch sensitive area 212 or on different touch sensitive areas, such as touch pad 302 and display screen 304 of FIG. 3, of information handling system 202. In response to multiple touch inputs, haptics controller 230 of the haptic feedback circuit may disable haptic feedback in the location of pen device 204 and may simultaneously provide haptic feedback at the location of the finger.

Haptics controller 230 may improve information handling system 202 by enabling haptic feedback to particular functions, such as a touch input from finger 402, but selectively and automatically disabling haptic feedback in a dynamic fashion for touch inputs from pen device 204. Additionally, one or more controllers, such as platform controller hub 220 and embedded controller 222 may interface with haptics controller 230, touch input controller 236, and pen controller 240 to improve information handling system 202 by adjusting haptic feedback based on user workloads, to optimally adjust the feedback behavior in alignment with the workload. In certain examples, embedded controller 222 may provide workload information to touch input controller 236 via any suitable communication port, such as an I²C communication port between the embedded controller and the touch input controller. In an example, platform controller hub 220 may provide workload information to haptics controller 230 of the haptic feedback circuit via any suitable communication bus, such as an I²C communication bus between the platform controller hub and the haptics controller.

Figure 5:
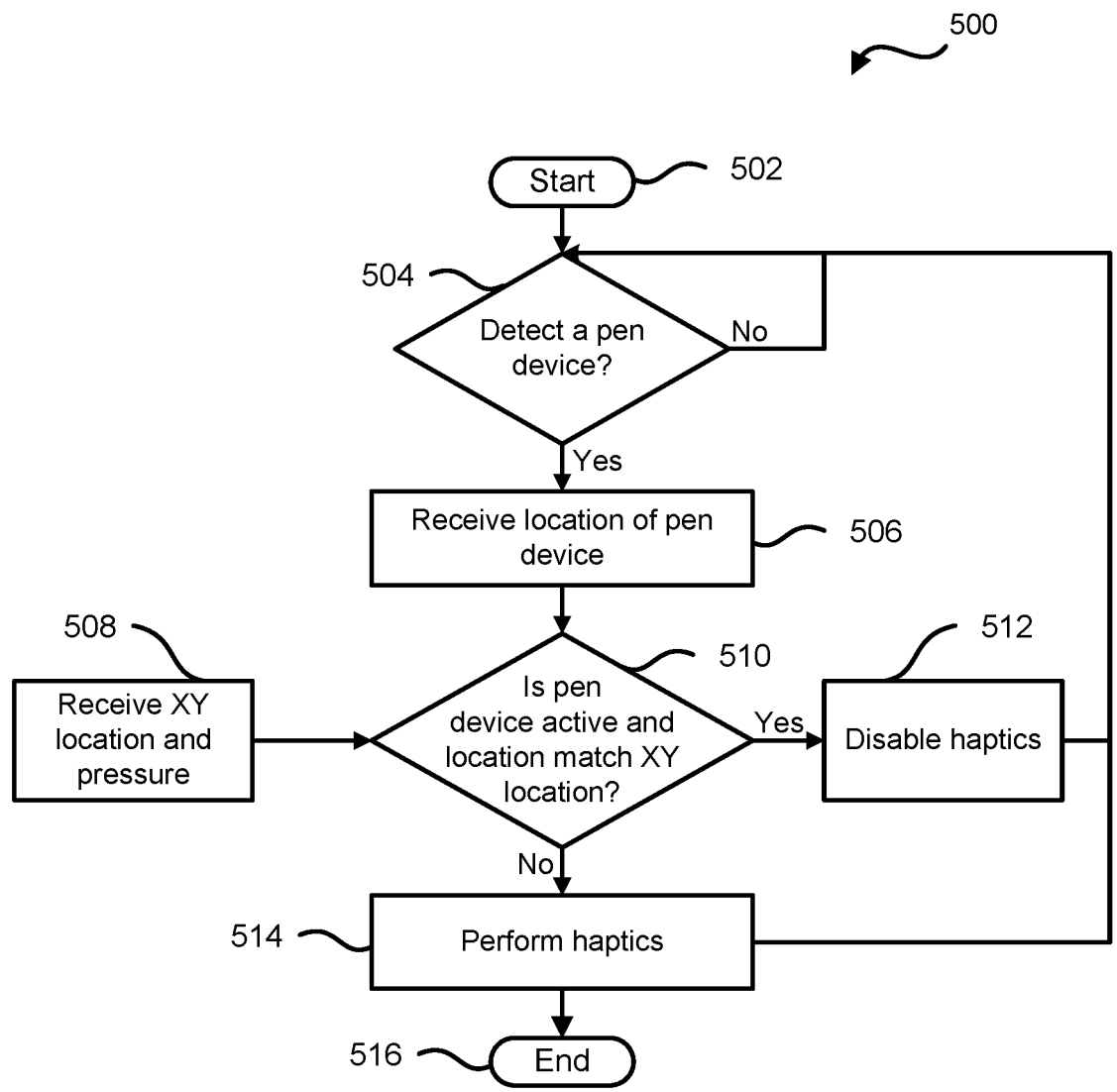
FIG. 5 is a flow diagram of a method for dynamically disabling haptic feedback with recognition of a pen on a touch sensitive area of an information handling system according to at least one embodiment of the present disclosure.

FIG. 5 illustrates a flow diagram of a method 500 for dynamically disabling haptic feedback with recognition of pen on touchpad according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 202 depicted in FIG. 2, or any other type of system, controller, device, module, processor, or any combination thereof, operable to employ all, or portions of, the method of FIG. 5.

At block 504, a determination is made whether a pen device is detected. In an example, the pen device may be detected on any suitable touch sensitive area including, but not limited to, a touch pad and a touch display screen. In certain examples, the detection of the pen device may be performed in any suitable manner including, but not limited to, the pen device communicating with one or more sensors with the touch sensitive area of the information handling system. In an example, communication between pen device and the sensor may be utilized to determine a distance between the pen device and the touch sensitive area. In response to the pen device being within a particular distance of the touch sensitive area, the detection of the pen device is made.

In response to the pen device being detected, a location of the pen device is received at block 506. In an example, the location may be received at any suitable component of the information handling system including, not limited to, a haptics controller, a capacitive sensor, a touch sensor, and a pen digitizer. In certain examples, haptics controller may be any suitable type of processor.

At block 508, XY location and pressure information is received. In an example, the XY location and pressure information may be received from a piezoelectric sensor in an array of piezoelectric sensors. In certain examples, the XY location may be calculated in any suitable manner including, but not limited to, an XY location assigned to the particular piezoelectric sensor based on its location within the array of piezoelectric sensors.

At block 510, a determination is made whether the pen device is active and if location of the pen device matches the XY location. In an example, any suitable device or component may compare the location of the pen device and the XY location. For example, a haptics controller, a touch input controller, pen controller, or embedded controller of the information handling system may perform the comparison.

If the location of the pen device matches the XY location, haptics of the touch sensitive area are disabled at block 512 and flow continues as described above at block 504. However, if the location of the pen device does not match the XY location, haptics at the XY location are performed at block 514, and the flow ends at block 516. Additionally, the flow may continue as described above at block 504. In an example, the haptics may be any suitable feedback including, but not limited to, a click, a pop, and a vibration. In certain examples, the haptic feedback may also be accompanied by an audio feedback.

While the computer-readable medium 128 of information handling system 100 is shown in FIG. 1 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    detecting a pen device in a touch sensitive area of an information handling system;
    receiving, by a haptics controller, an XY location associated with a pressure sensor within the touch sensitive area;
    receiving a location of the pen device from a pen digitizer circuit;
    calculating whether the XY location and the location of the pen device are substantially same location;
    in response to the XY location and the location of the pen device being substantially the same location and the pen device being active, disabling, by the haptics controller, haptic feedback within the touch sensitive area; and
    in response to the XY location and the location of the pen device not being substantially the same location, continuing to enable the haptic feedback within the touch sensitive area.

2. The method of claim 1, further comprising: in response to the XY location and the location of the pen device not being substantially the same location: determining that the XY location is associated with a pressure input other than the pen device; and providing the haptic feedback at the XY location within the touch sensitive area.

3. The method of claim 1, wherein the detecting of the pen device further comprises:
    receiving an electrical signal from the pen device at one of a plurality of capacitive sensors within the touch sensitive area.

4. The method of claim 3, wherein the location of the pen device further comprises:
    communicating, by the one of the plurality of capacitive sensors, with the pen device, wherein the plurality of capacitive sensors form a capacitive sensor array.

5. The method of claim 1, wherein the pressure sensor is one of a plurality of pressure sensor in a pressure sensor array within the touch sensitive area.

6. The method of claim 1, further comprising:
    calculating the XY location based on a position of the pressure sensor within an array of pressure sensors.

7. The method of claim 1, wherein the touch sensitive area is a non-display area of the information handling system.

8. An information handling system comprising:
    a touch sensitive area including:
        an array of pressure sensors including a first pressure sensor that when activated provides an XY location associated with an input at the first pressure sensor; and
        a haptics controller to communicate with the array of pressure sensors and an array of capacitor sensors, the haptics controller to receive the XY location from the first pressure sensor, to receive a location of a pen device from a pen digitizer circuit, to calculate whether the XY location and the location of the pen device are substantially same location, in response to the XY location and the location of the pen device being substantially the same location and the pen device being active, to disable haptic feedback within the touch sensitive area, in response to the XY location and the location of the pen device not being substantially the same location, the haptics controller to continue to enable the haptic feedback within the touch sensitive area.

9. The information handling system of claim 8, wherein in response to the XY location and the location of the pen device not being substantially the same location, the haptics controller to determine that the XY location is associated with a pressure input other than the pen device, and to provide the haptic feedback at the XY location within the touch sensitive area.

10. The information handling system of claim 8, further comprising the haptics controller to receive an electrical signal from the pen device at one of a plurality of capacitive sensors within the touch sensitive area.

11. The information handling system of claim 10, wherein the location of the pen device further comprises the one of the plurality of capacitive sensors to communicate with the pen device, wherein the plurality of capacitive sensors are form a capacitive sensor array.

12. The information handling system of claim 8, wherein the first pressure sensor is one of a plurality of pressure sensor in a pressure sensor array within the touch sensitive area.

13. The information handling system of claim 8, wherein the first pressure sensor to calculate the XY location based on a position of the first pressure sensor within the array of pressure sensors.

14. The information handling system of claim 8, wherein the touch sensitive area is a non-display area of the information handing system.

15. A non-transitory computer-readable storage medium including code that when executed performs a method, the method comprising:
   detecting a pen device in a touch sensitive area of an information handling system;
   receiving an XY location associated with a pressure sensor within the touch sensitive area;
   receiving a location of the pen device from a pen digitizer circuit;
   in response to the XY location and the location of the pen device are substantially a same location and the pen device is active, then disabling haptic feedback within the touch sensitive area; and
   in response to the XY location and the location of the pen device are not substantially the same location, then continuing to enable the haptic feedback within the touch sensitive area.

16. The non-transitory computer-readable storage medium of claim 15, wherein the method further comprises:
   in response to the XY location and the location of the pen device not being substantially the same location:
      determining that the XY location is associated with a pressure input other than the pen device; and
      providing the haptic feedback at the XY location within the touch sensitive area.

17. The non-transitory computer-readable storage medium of claim 15, wherein the location of the pen device, the method further comprises:
   communicating, by the one of a plurality of capacitive sensors, with the pen device, wherein the plurality of capacitive sensors are form a capacitive sensor array.

* * * * *